US011169728B2

(12) United States Patent
Cheru

(10) Patent No.: US 11,169,728 B2
(45) Date of Patent: Nov. 9, 2021

(54) REPLICATION CONFIGURATION FOR MULTIPLE HETEROGENEOUS DATA STORES

(71) Applicant: Western Digital Technologies, Inc., San Jose, CA (US)

(72) Inventor: Tomy Ammuthan Cheru, Thrissur (IN)

(73) Assignee: Western Digital Technologies, Inc., San Jose, CA (US)

( * ) Notice: Subject to any disclaimer, the term of this patent is extended or adjusted under 35 U.S.C. 154(b) by 2 days.

(21) Appl. No.: 16/565,706

(22) Filed: Sep. 10, 2019

(65) Prior Publication Data

US 2021/0072895 A1 Mar. 11, 2021

(51) Int. Cl.
*G06F 3/06* (2006.01)

(52) U.S. Cl.
CPC ............ *G06F 3/065* (2013.01); *G06F 3/0617* (2013.01); *G06F 3/0635* (2013.01); *G06F 3/0653* (2013.01); *G06F 3/0659* (2013.01); *G06F 3/0683* (2013.01)

(58) Field of Classification Search
CPC ...................................................... G06F 3/065
See application file for complete search history.

(56) References Cited

U.S. PATENT DOCUMENTS 9,165,005 B2 * 10/2015 Beaverson ............ G06F 3/0616
2010/0011014 A1 * 1/2010 Odulinski ............ G06F 16/258 707/E17.006
2011/0320406 A1 12/2011 Howell et al.
2012/0331248 A1 * 12/2012 Kono ................. G06F 11/1458 711/162
2014/0365437 A1 12/2014 Srinivasan
2015/0269032 A1 * 9/2015 Muthyala ............. G06F 3/0607 707/639

(Continued)

FOREIGN PATENT DOCUMENTS

EP 1625502 B1 4/2017
EP 1828935 B1 5/2018

OTHER PUBLICATIONS

Speciale, P., Title Roadmap, What's Next for Our Open Source Multi-Cloud Data Controller, Blog Post, Jul. 14, 2017, p. 1-4, https://www.zenko.io/blog/zenko-rollout-plan/.

(Continued)

*Primary Examiner* — Sanjiv Shah
*Assistant Examiner* — Alexander J Yoon
(74) *Attorney, Agent, or Firm* — Patent Law Works LLP

(57) ABSTRACT

Example distributed storage systems, replication managers, and methods provide replication configurations for data transfers to multiple heterogeneous data stores. A first object data store includes multiple storage buckets for replication to different data stores. Different target storage systems have different system configurations that are different than the native system configuration. For each storage bucket and corresponding target storage system, a native replication operation is translated to a target replication operation compatible with the target system configuration and the target replication operation is used to replicate the selected storage bucket to the corresponding target storage system.

20 Claims, 8 Drawing Sheets

Figure 6

(56) References Cited

U.S. PATENT DOCUMENTS

| | | | | |
|---|---|---|---|---|
| 2016/0188232 | A1* | 6/2016 | Ramachandran | ... G06F 11/1484 711/162 |
| 2019/0102418 | A1 | 4/2019 | Vasudevan et al. | |
| 2019/0272220 | A1 | 9/2019 | Vijayan et al. | |

OTHER PUBLICATIONS

Unknown, How to Replicate S3 Buckets Across Regions, Stratoscale Blog Post, May 2, 2019, p. 1-9, https://www.stratoscale.com/blog/storage/replicate-s3-buckets-across-regions/.

Unknown, Cross-Region Replication, Amazon Simple Storage Service Developer Guide, Mar. 1, 2006, p. 1-2, https://docs.aws.amazon.com/AmazonS3/latest/dev/crr.html.

Unknown, High Availability and Replication Architecture, Couchbase Server, Accessed Jul. 1, 2019, p. 1-8, https://www.docs.couchbase.com/server/5.1/architecture/high-availability-replication-architecture.html.

Unknown, Scality / backbeat, Zenko, Scality's Open Source Multi-Cloud Data Controller, GitHub Message Board, Accessed Sep. 9, 2019, p. 1-2, https://github.com/scality/backbeat.

Chromiak, M., et al., A data model for heterogeneous data integration architecture. International Conference: Beyond Databases, Architectures and Structures, May 27, 2014, p. 547-556, Springer, Cham.

International Search Report and Written Opinion of Application No. PCT/US2020/024782, dated May 27, 2020 (13 pages).

* cited by examiner

REPLICATION CONFIGURATION FOR MULTIPLE HETEROGENEOUS DATA STORES

TECHNICAL FIELD

The present disclosure generally relates to data storage, and in a more particular example, to replication configurations for data transfer between heterogeneous data stores.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may include a variety of storage systems in varying locations and of varying ages and configurations. As a result, not all object data stores within a large-scale storage system may be configured to manage data objects and their related metadata in the same way. Such disparate configurations within the same overall storage architecture may be referred to as heterogeneous data stores. Within or between object storage systems, individual buckets may also be configured differently and described as heterogeneous.

Large-scale storage systems generally distribute the stored data over multiple storage elements, such as for example solid state drives, or multiple components such as storage nodes comprising a plurality of such storage elements. However, as the number of storage elements in such a distributed storage system increase, the probability of failure of one or more of these storage elements increases, as does the probability of failure or interruption of controller, network, and interface components. To cope with these issue, distributed storage systems generally use some level of redundancy at the data, storage node, controller, interface, client, and network levels. In some cases, redundancy may include moving data objects between object data stores, such as using one or more replication agents, for mirroring, load balancing, and/or disaster recovery.

Replication among heterogeneous data stores may present a challenge. While some data stores may be configured with similar configurations, even data stores supporting a defined storage protocol may not have entirely compliant configurations. For example, each vendor within a cloud storage ecosystem or each manufacturer of storage system products may support different parameters and extensions for defining and managing data objects. As a result, it may not be possible in some systems to easily replicate data objects between buckets in these heterogeneous data stores without losing functionality, risking errors, or manually managing differences in configurations. In dynamic storage environments, inability to replicate storage buckets across multiple heterogeneous data stores may limit the efficiency, load balancing, and reliability of the overall storage system.

As large-scale storage systems scale and create more heterogeneous object data stores within storage systems, reliable and efficient implementations for managing replication across multiple heterogeneous data stores may be needed. A need exists for at least improved replication configuration for data transfer between heterogeneous data stores.

SUMMARY

Various aspects for versioning validation, particularly, versioning validation for data transfer between heterogeneous data stores are described.

One general aspect includes a system that includes a first object data store configured in a native system configuration and configured to include: a first storage bucket configured to include a first plurality of data objects; and a second storage bucket configured to include a second plurality of data objects. The system also includes a replication manager configured to: identify a first target storage system for the first storage bucket, where the first target storage system has a first system configuration that is different than the native system configuration; selectively translate a first native replication operation to a first target replication operation compatible with the first system configuration; replicate the first storage bucket to the first target storage system using the first target replication operation; identify a second target storage system for the second storage bucket, where the second target storage system has a second system configuration that is different than the native system configuration and the first system configuration; selectively translate a second native replication operation to a second target replication operation compatible with the second system configuration; and replicate the second storage bucket to the second target storage system using the second target replication operation.

Implementations may include one or more of the following features. The system may further include a compatibility engine in communication with the replication manager and configured to: identify a first system configuration identifier for the first target storage system; select, using the first system configuration identifier, a first translation function for the first system configuration, where the replication manager selectively translates, using the first translation function, the first native replication operation to the first target replication operation; identify a second system configuration identifier for the second target storage system; and select, using the second system configuration identifier, a second translation function for the second system configuration, where the replication manager is configured to selectively translate, using the second translation function, the second native replication operation to the second target replication operation. The system may further include a translation table configured to include: an index of system configuration identifiers, where the index of system configuration identifiers includes the first system configuration identifier and the second system configuration identifier; and a plurality of translation functions, where the plurality of translation functions includes at least one translation function for each system configuration identifier in the index of system configuration identifiers, the first translation function, and the second translation function. The replication manager may be further configured to: receive a first replication work task for the first storage bucket; identify first replication path information for the first replication work task, where the first replication path information identifies the first target storage system and includes a first system configuration identifier; use the first system configuration identifier to selectively translate the first native replication operation to the first target replication operation; receive a second replication work task for the second storage bucket; identify second replication path information for the second replication work task, where the second replication path information identifies the second target storage system and includes a second system configuration identifier; and use the second system configuration identifier to selectively translate the second native replication operation to the second target replication operation. The replication manager may be further configured to: access the first replication path information from a first replication configuration file for the first storage bucket; and access the second replication path information from a second replication configuration file for the second storage bucket. The first replication path information may include a first partition value and the first partition value may include the first system configuration identifier. The second replication path information may include a second partition value and the second partition value may include the second system configuration identifier. The first replication path information may further include a first service identifier, a first region identifier, a first account identifier, and a first destination bucket identifier. The second replication path information may further include a second service identifier, a second region identifier, a second account identifier, and a second destination bucket identifier. The system may further include a replication configuration interface configured to: receive the first replication path information; store the first replication path information, where the replication manager is further configured to access, responsive to receiving the first replication work task, the first replication path information; receive the second replication path information; and store the second replication path information, where the replication manager is further configured to access, responsive to receiving the second replication work task, the second replication path information.

Another general aspect includes a computer-implemented method, including: identifying, by a source storage system having a source system configuration, a first target storage system for a first storage bucket from the source storage system, where the first target storage system has a first system configuration that is different than the source system configuration; selectively translating, by the source storage system, a first source replication operation to a first target replication operation compatible with the first system configuration; replicating, by the source storage system, the first storage bucket to the first target storage system using the first target replication operation; identifying, by the source storage system, a second target storage system for a second storage bucket from the source storage system, where the second target storage system has a second system configuration that is different than the source system configuration and the first system configuration; selectively translating, by the source storage system, a second source replication operation to a second target replication operation compatible with the second system configuration; and replicating, by the source storage system, the second storage bucket to the second target storage system using the second target replication operation.

Implementations may include one or more of the following features. The computer-implemented method may further include: identifying a first system configuration identifier for the first target storage system; selecting, using the first system configuration identifier, a first translation function for the first system configuration, where selectively translating the first source replication operation to the first target replication operation uses the first translation function; identifying a second system configuration identifier for the second target storage system; and selecting, using the second system configuration identifier, a second translation function for the second system configuration, where selectively translating the second source replication operation to the second target replication operation uses the second translation function. The computer-implemented method may further include: receiving a first replication work task for the first storage bucket; identifying first replication path information for the first replication work task, where the first replication path information identifies the first target storage system and includes a first system configuration identifier, where selectively translating the first source replication operation to the first target replication operation uses the first system configuration identifier; receiving a second replication work task for the second storage bucket; and identifying second replication path information for the second replication work task, where the second replication path information identifies the second target storage system and includes a second system configuration identifier, where selectively translating the second source replication operation to the second target replication operation uses the second system configuration identifier. The computer-implemented method may further include: accessing the first replication path information from a first replication configuration file for the first storage bucket; and accessing the second replication path information from a second replication configuration file for the second storage bucket. The first replication path information may include a first partition value and the first partition value may include the first system configuration identifier. The second replication path information may include a second partition value and the second partition value includes the second system configuration identifier. The first replication path information may further include a first service identifier, a first region identifier, a first account identifier, and a first destination bucket identifier. The second replication path information may further include a second service identifier, a second region identifier, a second account identifier, and a second destination bucket identifier. The computer-implemented method may further include: receiving the first replication path information through a replication configuration interface; storing the first replication path information; accessing, responsive to receiving the first replication work task, the first replication path information; receiving the second replication path information through the replication configuration interface; storing the second replication path information; and accessing, responsive to receiving the second replication work task, the second replication path information.

Another general aspect includes a system that includes a first object data store configured in a source system configuration and configured to include: a first storage bucket configured to include a first plurality of data objects; and a second storage bucket configured to include a second plurality of data objects. The system further includes means for identifying: a first target storage system for the first storage bucket, where the first target storage system has a first system configuration that is different than the source system configuration; and a second target storage system for the second storage bucket, where the second target storage system has a second system configuration that is different than the source system configuration and the first system configuration. The system further includes means for selectively translating: a first source replication operation to a first target replication operation compatible with the first system configuration; and a second source replication operation to a second target replication operation compatible with the second system configuration. The system further includes means for replicating: the first storage bucket to the first target storage system using the first target replication operation; and the second storage bucket to the second target storage system using the second target replication operation.

Implementations may include one or more of the following features. The system may further include means for identifying: a first system configuration identifier for the first target storage system; and a second system configuration identifier for the second target storage system. The system may further include means for selecting: using the first system configuration identifier, a first translation function for the first system configuration, where the means for selectively translating the first source replication operation to the first target replication operation uses the first translation function; using the second system configuration identifier, a second translation function for the second system configuration, where the means for selectively translating the second source replication operation to the second target replication operation uses the second translation function. The system may further include means for receiving: a first replication work task for the first storage bucket; and a second replication work task for the second storage bucket. The system may further include means for identifying: first replication path information for the first replication work task, where the first replication path information identifies the first target storage system and includes a first system configuration identifier, where the means for selectively translating the first source replication operation to the first target replication operation uses the first system configuration identifier; and second replication path information for the second replication work task, where the second replication path information identifies the second target storage system and includes a second system configuration identifier, where the means for selectively translating the second source replication operation to the second target replication operation uses the second system configuration identifier. The system may further include means for accessing: the first replication path information from a first replication configuration file for the first storage bucket; and the second replication path information from a second replication configuration file for the second storage bucket. The first replication path information may include a first partition value and the first partition value may include the first system configuration identifier. The second replication path information may include a second partition value and the second partition value may include the second system configuration identifier.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the replication configurations for data transfer between heterogeneous data stores, such as by translating native replication operations for transferring data objects between data stores. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Object storage systems have a notion of data objects. Data objects may be contained in storage buckets and each bucket may be associated with a specific object storage system or object data store. Specific object storage systems may include a number of configuration parameters for enabling, disabling, or customizing system-specific features and extensions for managing data objects. Different storage systems and related object stores may support different system configurations, each defining a specific syntax of parameters, arguments, and protocols for generating, modifying, and communicating system configurations. Among heterogeneous storage systems, these system configurations are different and mutually incompatible for at least some system features. For example, a replication operation within one storage system may be incompatible with another storage system. The native replication operation would fail to execute or have a different result if it was attempted on a storage system with a different system configuration.

In some object storage systems, there may be replication between different storage systems, sometimes referred to as cross region replication, but the storage systems must be using the same system configuration. For example, one vendor's storage system may replicate to another storage system of the same vendor. In some systems, one storage system may be configured to specifically support cross region replication to a heterogeneous storage system using a hard-coded compatibility engine. For example, a storage system vendor may specifically enable a replication channel to a particular cloud storage service by implementing an interface for that cloud storage service's application programming interface (API). These systems may not support coexistence of replication to multiple heterogeneous data stores.

In many object storage systems, a data object is written using either a PUT function, for single part objects, or a multi-part write process, such as INIT, multiple PARTPUT, and COMPLETE functions. Data objects written to a versioning not enabled or versioning suspended system or bucket, may create a data object with a version value set to null and a creation timestamp. Subsequent read functions, such as GET, of the data object with a defined object name (ex. "object1") may return the data object ("object1"). If an object is later written with the same object name ("object1"), the original object may be overwritten. Subsequent GET operations with the object name ("object1") may return the overwritten object and the original object may be lost. Despite the commonality of the basic syntax, there is considerable variability in the parameters, arguments, and other features that manage and modify these basic operations and their related data objects and storage buckets. These variations in command syntax and supported arguments may be defined as system configurations.

Figure 1:
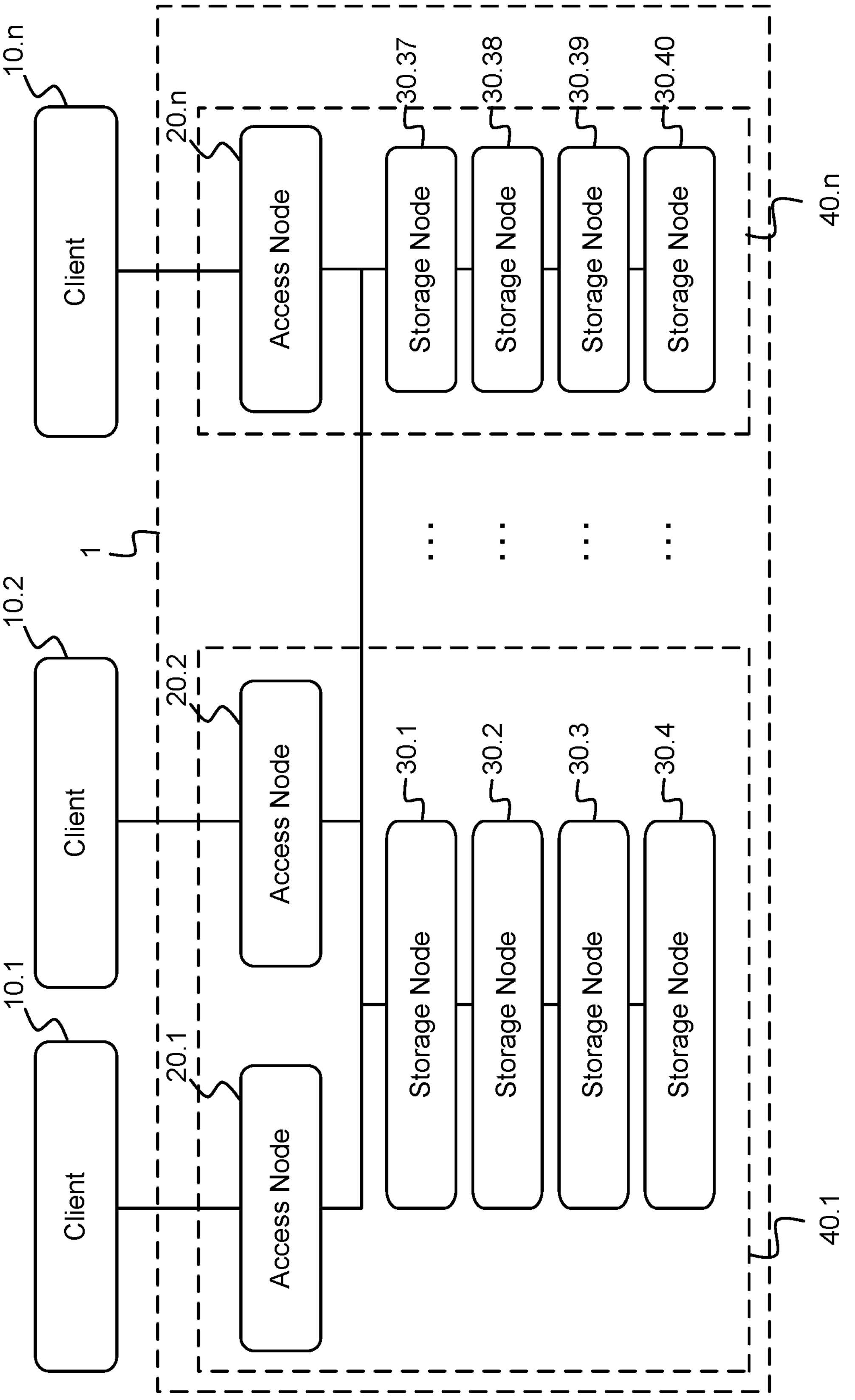
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.*n* for accessing data objects through one or more access nodes 20.1-10.*n*. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.*n* comprising standard dimensions. Exemplary access nodes 20 and storage nodes 30 may be dimensioned to take up a single unit of such racks 40, which is generally referred to as 1 U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft.Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.*n*. Access nodes 20 may be located in the same or different racks as the storage nodes to which the access nodes connect. A rack may have multiple access nodes, for example rack 40.1, a single access node as rack 40.*n*, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
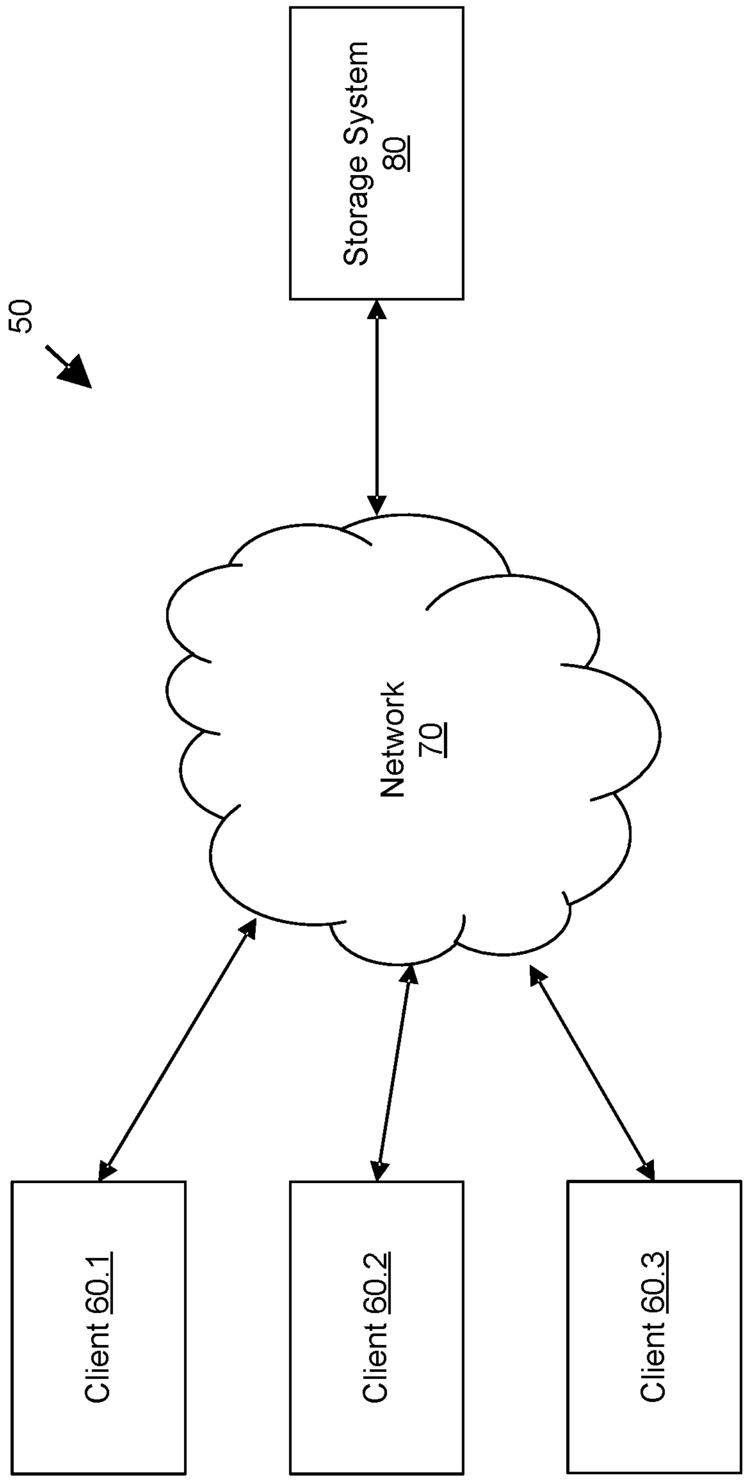
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
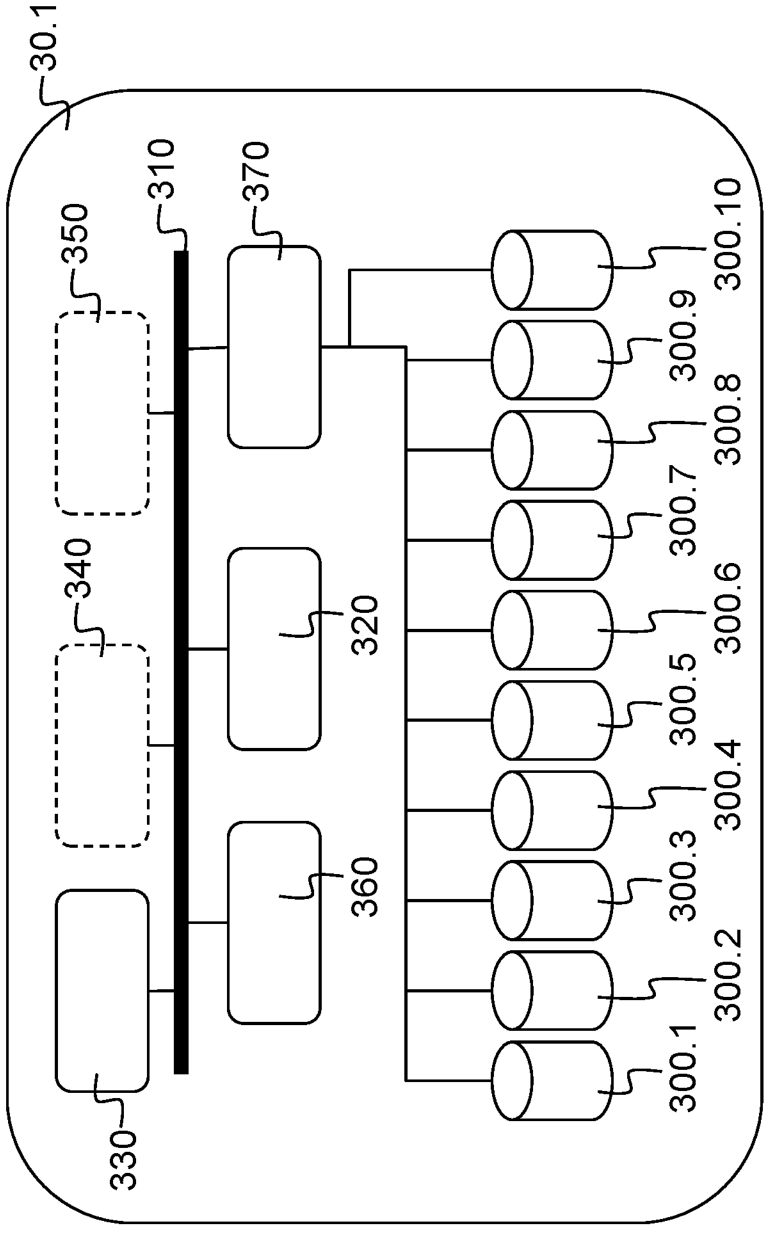
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 3 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
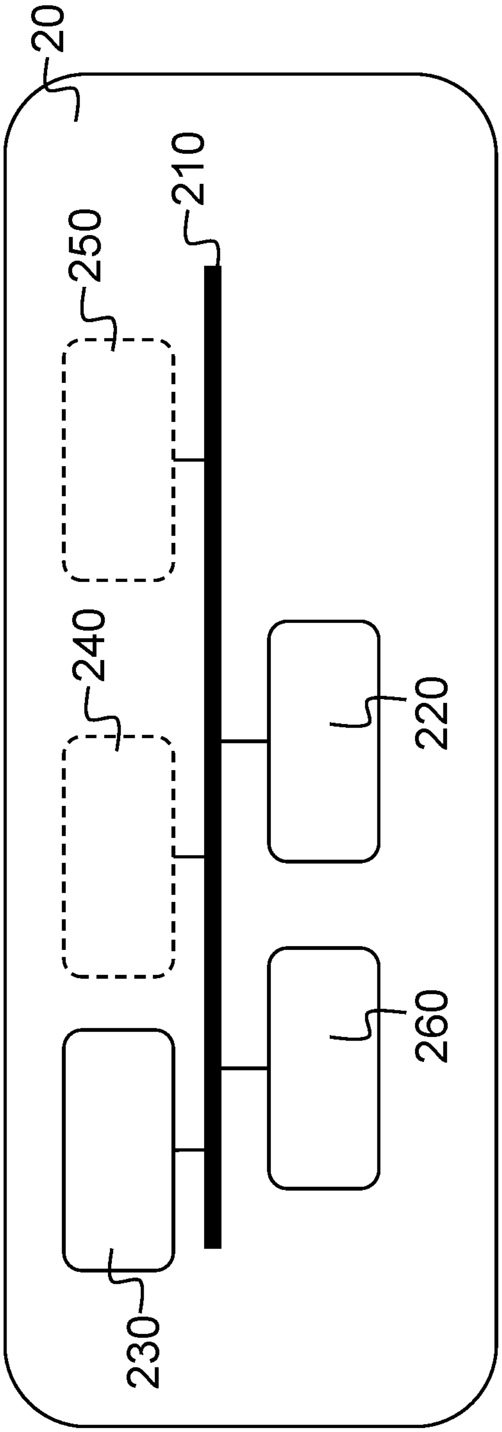
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, configuration management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
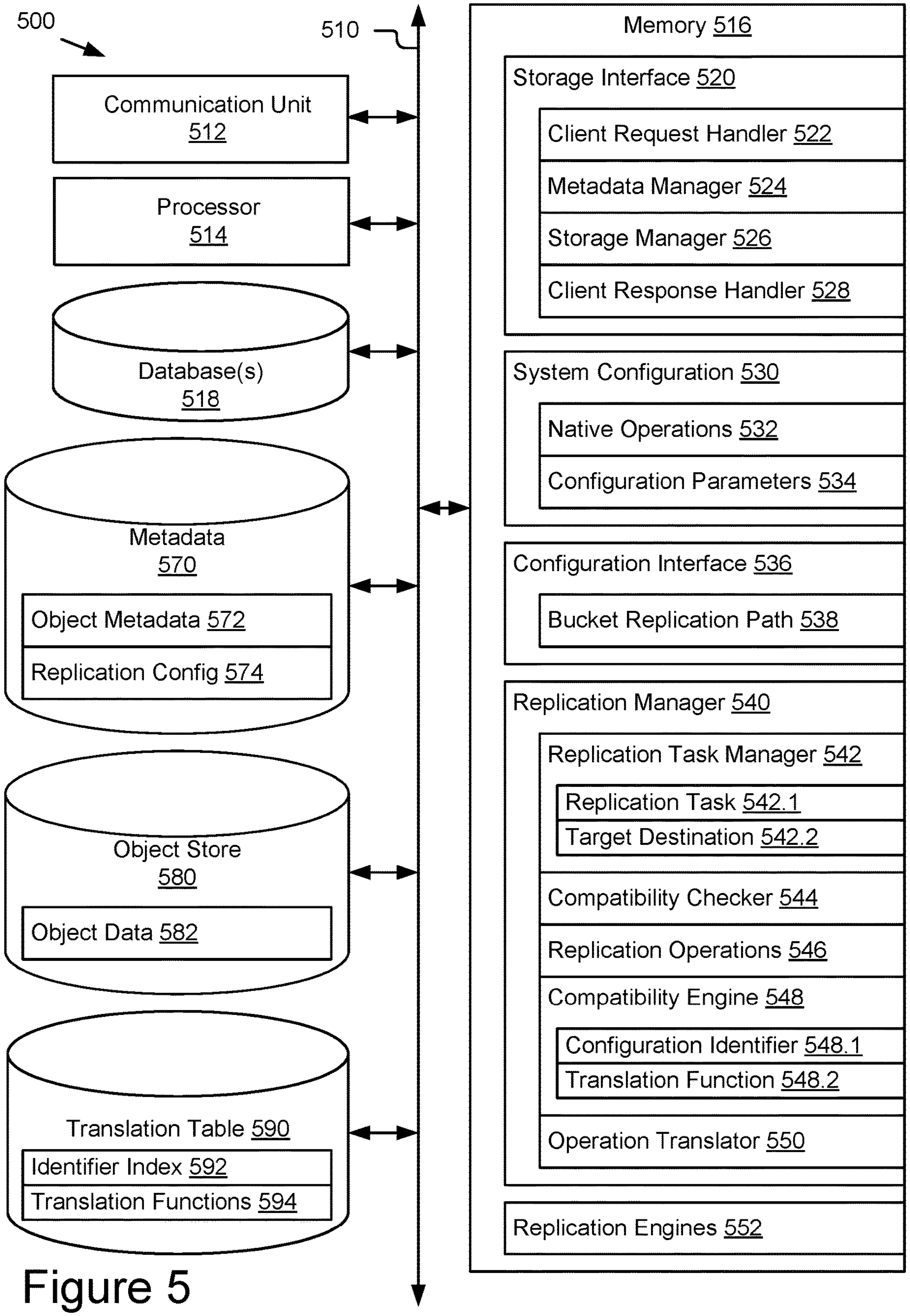
FIG. 5 schematically illustrates some example elements of an object storage system for the distributed storage system of FIG. 1.

FIG. 5 schematically shows selected modules of an access node, storage node, or controller node with replication management and supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions and metadata store 570 and/or object store 580 may be embodied in one or more storage nodes 30 in communication with access node 20.

Object storage system 500 may include a bus 510 interconnecting at least one communication unit 512, at least one processor 514, and at least one memory 516. Bus 510 may include one or more conductors that permit communication among the components of object storage system 500. Communication unit 512 may include any transceiver-like mechanism that enables object storage system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 570, object store 580, and/or translation table 590. Databases may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects stored in object store 580. Object store 580 may include data objects comprised of object data (such as host data), some amount of metadata (stored as metadata tags), and a GUID. Metadata store 570, object store 580, and/or other databases or data structures may be maintained and managed in separate computing systems, such as storage nodes, with separate communication, processor, memory, and other computing resources and accessed by object storage system 500 through data access protocols. Metadata store 570 and object store 580 may be shared across multiple object storage systems 500.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include a system configuration 530 for defining the syntax, parameters, protocols, etc. used for accessing object store 560. Memory 516 may include a configuration interface 536 for enabling a user or system utility to configure and select interfaces for replication to other object storage systems. Memory 516 may include a replication manager 540 for processing data replication between storage nodes or storage systems, such as transferring or replicating data objects to other object stores that may be heterogeneous. In some embodiments, configuration interface 536 and/or replication manager 540 may be integrated into storage interface 520 and/or managed as separate libraries or background processes (e.g. daemon) through an API or other interface.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request.

Metadata manager 524 may include interfaces, functions, and/or parameters for creating, modifying, deleting, accessing, and/or otherwise managing object metadata, such as object metadata 572 stored in metadata store 570. For example, when a new object is written to object store 580, at least one new metadata entry may be created in metadata store 570 to represent parameters describing or related to the newly created object. Metadata manager 524 may generate and maintain an object data index that enables metadata manager 524 to locate object metadata within metadata store 570. For example, metadata store 570 may be organized as a key-value store and object data index may include key values for data objects and/or operations related to those objects that are indexed with a key value that include the object identifier or GUID for each object. In some embodiments, metadata manager 524 may also manage object metadata stored in object store 580 with object data 582. Metadata manager 524 may work in conjunction with storage manager 526 to create, modify, delete, access or otherwise manage object metadata stored as object tags within object store 580.

Storage manager 526 may include interfaces, functions, and/or parameters for reading, writing, and deleting object data elements in object store 580. For example, object PUT commands may be configured to write object identifiers, object data 564, and/or object tags to object store 580. Object GET commands may be configured to read data from object store 580. Object DELETE commands may be configured to delete data from object store 580, or at least mark a data object for deletion until a future garbage collection or similar operation actually deletes the data or reallocates the physical storage location to another purpose.

Other object storage commands may be handled by storage manager 526, including special functions defined for version control. Object storage commands processed by storage manager 526 may include parameters for accessing special functions and/or metadata resources stored with host or client data in the data objects. Storage manager 526 may work in conjunction with metadata manager 524 for managing object metadata, including versioning information. Storage manager 526 may work in conjunction with replication manager 540 to replicate or migrate data from object store 560 to another data store. For example, storage manager 526 may read the object store 560 for transfer by one or more replication engines managed by replication manager 540.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received In some embodiments, metadata store 570 may be distributed across multiple systems, such as a plurality of access systems. Metadata store 570 and/or portions thereof may be sharded data stores, wherein the data stores are partitioned into segments stored in different computing systems. Storage interface 520 may include the functions for locating and accessing relevant portions of the sharded data base.

System configuration 530 may include one or more object storage configurations that define a storage protocol used for validating, managing, and processing object data requests. For example, object storage configurations may generally define the availability of various features, parameters, and/or extensions for managing objects and/or buckets. Object storage configurations may also define what metadata is collected and stored, as well as whether it is stored in a metadata database, such as metadata store 570, in object metadata tags stored in the data objects, and/or a combination thereof. In some embodiments, system configuration 530 may include one or more vendor-specific features that include protocols, parameters, and/or extensions not generally available or defined as part of an object storage standard.

System configuration 530 may define a plurality of native storage operations 532 used by object storage system 500. For example, object storage system 500 may support a variety of storage operations, including implementations of GET, PUT, DELETE, and other object storage commands. Native storage operations 532 may include the storage operations handled by storage interface 520 for reading from and writing to object store 560, including vendor-specific features implemented for object storage system 500.

In some embodiment, native storage operations 532 may include native object or bucket replication operations that transfer identified data objects, such as the contents of an identified storage bucket, from a first object store, such as object store 560, to a second object store, such as an object store in another storage system. Native storage operations 532 may include replication operations compatible with other object storage systems with a similar system configuration that supports the same native storage operations, such as an object storage system by the same vendor or specifically configured to support cross-vendor replication operations using the same native storage operations 532.

System configuration 530 may support one or more configuration parameters 534 that enable a user or system utility to customize operation of object storage system 500. For example, system configuration 530 may support a variety of features that may be enabled, disabled, or otherwise customized to govern native storage operations 532. In some embodiments, configuration parameters 534 may be stored in one or more configuration files, tables, or other data structures, such as within metadata store 570 or local database(s) 518.

Configuration interface 536 may include one or more interfaces, such as a user interface or application programming interface (API) for receiving configuration parameters for use by system configuration 530. For example, system configuration 530 may support a variety of features defined by configuration parameters 534. In some embodiments, configuration interface 536 may support a graphical user interface, command line interface, or configuration utility that provides a user, such as a storage system administrator, access to configuration parameters 534. For example, one or more system configuration files and/or configuration parameters 534 stored therein may be generated or modified responsive to configuration interface 536. In some embodiments, configuration interface 536 may be or include one or more specialized interfaces, such as a replication configuration interface that is configured for configuring replication configuration parameters.

In some embodiments, configuration parameters 534 may include replication configuration parameters, such as replication configuration file 554 in metadata store 570, and the replication configuration parameters may include bucket replication path 538 for each bucket configured for replication in object store 580. For example, bucket replication path 538 may define the target destination for replication of an identified storage bucket.

In some embodiments, replication configuration may be implemented through a configuration command received by configuration interface 536. For example, an S3 compatible object storage system may include an S3 API that accepts a “put-bucket-replication” command for configuring replication for a target storage bucket. The API may accept an option “—replication-configuration” that uses a replication configuration parameter file to define replication parameters, including bucket replication path 538. For example, configuration interface 536 may accept a JavaScript Object Notation (JSON) file in the following format:

```
<ReplicationConfiguration>
    <Role>IAM-role-ARN</Role>
    <Rule>
        ...
    </Rule>
    ...
    <Destination>
        <Bucket>arn:aws:s3:::destination-bucket</Bucket>
    </Destination>
    ...
</ReplicationConfiguration>
```

Destination may be a rule to denote a target resource name that defines a replication path for the replication. In the example above, "arn" (Amazon Resource Name) may be used to denote bucket "arn:aws:s3:::destination-bucket" where the path name may have a general format as follows:

"arn:partition:service:region:account-id:resource"

This format may include an amazon resource name identifier, a partition field, a service identifier field, a region identifier field, an account identifier field, and a resource name field. Other formats for defining a target replication destination using bucket replication path 538 may be possible.

In some embodiments, bucket replication path 538 may include a configuration identifier. Use of configuration identifiers will be further described below with regard to replication manager 540. For example, the partition field or parameter in the target resource name may include or be replaced by a configuration identifier, such as a string or numeric value that may be used to index handling of different destination system configurations. In some embodiments, the partition parameter may include a concatenated value that identifies both a partition value and a configuration identifier value.

Replication manager 540 may include functions, methods, or operations for managing the transfer of data objects to other object stores or object storage systems, including object stores with different system configurations that may not support the native replication operations. For example, replication manager 540 may manage one or more replication engines 552 that move data objects from object store 580 to a destination object store that may be remote from object store 580. Replication manager 540 may be configured to transfer data objects between heterogeneous data stores. In some embodiments, replication manager 540 transfers each data object in a source storage bucket, including object identifiers, object data 582, and associated object tags, to a destination storage bucket in another data store. In some embodiments, replication manager 540 may also transfer metadata associated with the data object from a corresponding metadata store, such as metadata store 570, using object data index to identify associated object metadata 572.

In some embodiments, replication manager 540 may be configured for asynchronous data transfers. For example, a scheduler may select object for transfer based on criteria other than the order in which they were ordered within object store 580, such as object size, availability, etc. In some embodiments, multiple replication engines 552 may operate in parallel and transfer objects for a target bucket at similar times and using resources and paths that may result in different transfer rates. Replication manager 540 may also support multipart data object transfers that include a plurality of write transactions to complete a single object replication. For example, a multipart write process may include a series of commands or messages, such as INIT, multiple PARTPUT, and COMPLETE replication operations.

In some embodiments, replication manager 540 may include one or more hardware and/or software modules or data structures for executing specific operations. For example, replication manager 540 may include a replication task manager 542, a compatibility checker 544, replication operations generator 546, compatibility engine 548 and operation translator 550.

Replication task manager 542 may include a daemon, interface protocols, and/or a set of functions and parameters for managing replication tasks for copying data objects to another object store. For example, when replication manager 540 is invoked by another subsystem, such as storage interface 520, replication task manager 542 may receive a message, command, or similar trigger that includes or generates a replication task. For example, a replication task 542.1 may identify a source bucket or similar group of data objects to be replicated from the source bucket to a destination bucket. Replication task 542.1 may include additional parameters related to prioritization or other features. Replication task manager 542 may manage a plurality of replication tasks in one or more replication task queues and include logic for selecting a next replication task for execution by replication engines 552. Replication task manager 542 may invoke other functions or modules within replication manager 540 to process or pre-process replication task 542.1 prior to sending one or more replication operations corresponding to the replication task to replication engines 552.

In some embodiments, replication task 542.1 may enable replication task manager 542 to access replication configuration 574 to determine target destination 542.2 for one or more replication operations. For example, replication task 542.1 may include one or more bucket identifiers and/or object identifiers from which a bucket identifier may be determined (as a portion of the object identifier or by using the object identifier to index metadata that includes the bucket identifier). The bucket identifier may, in turn, be used to index replication configuration 574 to gather replication parameters for use in generating replication operations for replication task 542.1, including target destination 542.2. For example, target destination 542.2 may be a resource described by bucket replication path 538 or a destination bucket identifier.

Compatibility checker 544 may include an operation, interface protocols, and/or a set of functions and parameters for checking whether target destination 542.2 supports replication operations that are directly compatible with native storage operations 532. For example, compatibility checker 544 may determine whether target destination 542.2 is a supported data store, such as a compatible data store from the same vendor or a vendor partner. In some embodiments, compatibility checker 544 may check the parameter values for bucket replication path 538 to determine whether the destination resource path includes a configuration identifier. The configuration identifier may indicate a configuration type that is directly compatible with the native replication operations. In some embodiments, the lack of a configuration identifier value in bucket replication path 538 may indicate a directly compatible target destination data store or an unknown or unsupported configuration type for target destination 542.2. In the latter case, an error or warning message may be generated (with or without completing replication task 542.1).

Replication operations generator 546 may include logic, interface protocols, and/or a set of functions and parameters for generating one or more native operations for execution by replication engines 552. Replication operations may be determined by replication task 542.1 and replication operations generator 546 may populate the parameters of replication operations based on parameters received in or determined from replication task 542.1. In some embodiments, replication operations generator 546 may generate native replication operations regardless of whether compatibility checker 544 determined target destination 542.2 to be compatible with native replication operations or in need of translation to a destination replication operation. In some embodiments, replication operations generator 546 may extract parameters from replication tasks 542.1 and determine one or more native storage operations for completing the task using a mapping logic, lookup table, or library of operations.

Compatibility engine 548 may include logic, interface protocols, and/or a set of functions and parameters for determining a translation function for translating a native replication operation to a replication operation compatible with the system configuration of a destination object store with a different system configuration. For example, compatibility engine 548 may use a configuration identifier 548.1, such as a system configuration identifier, determined for the destination object store to identify a translation function 548.2 that may be applied to the native replication operations or parameters thereof to generate destination replication operations. In some embodiments, configuration identifier 548.1 may be determined from bucket replication path 538, as described above. In other embodiments, configuration identifier 548.1 may be determined from other parameters of replication task 542.1 and/or metadata associated with the target data objects and/or storage bucket, such as a system configuration identifier stored in replication configuration 574 as its own rule or parameter.

In some embodiments, configuration identifier 548.1 may be used as an index value to determine a corresponding translation function 548.2. For example, compatibility engine 548 may include or access a lookup data structure, such as translation table 590. Translation table 590 may include a configuration identifier index 592 that includes each configuration identifier value handled by object storage system 500. Translation table 590 may include a plurality of translation functions 594 that map to the configuration identifiers in configuration identifier index 592. Configuration identifier 548.1 for the destination data store may be used to search configuration identifier index 592 to identify the corresponding entry and retrieve the translation function from translation functions 594 that maps the parameters of the native replication operation(s) to the parameters and syntax of the destination replication operation(s). For example, the system configuration of the destination object store may enable similar features, but may expect parameters in a different format, order, or tag. Translation functions 594 may include functions and/or supporting mapping data structures to convert the received native replication operation parameters to a properly formatted destination replication operation for execution by replication engines 552.

In some embodiments, compatibility engine 548 may identify the translation function from the plurality of translation functions 594 and operation translator 550 may include logic, interface protocols, and/or a set of functions and parameters for translating the native replication operation to the destination replication operation. For example, operation translator 550 may apply the translation function to the native replication operation and/or parameters extracted therefrom. In some embodiments, operation translator 550 may include a library for executing the translation functions 594 in association with replication engines 552 when the replication engines are invoked for execution of replication task 542.1.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6:
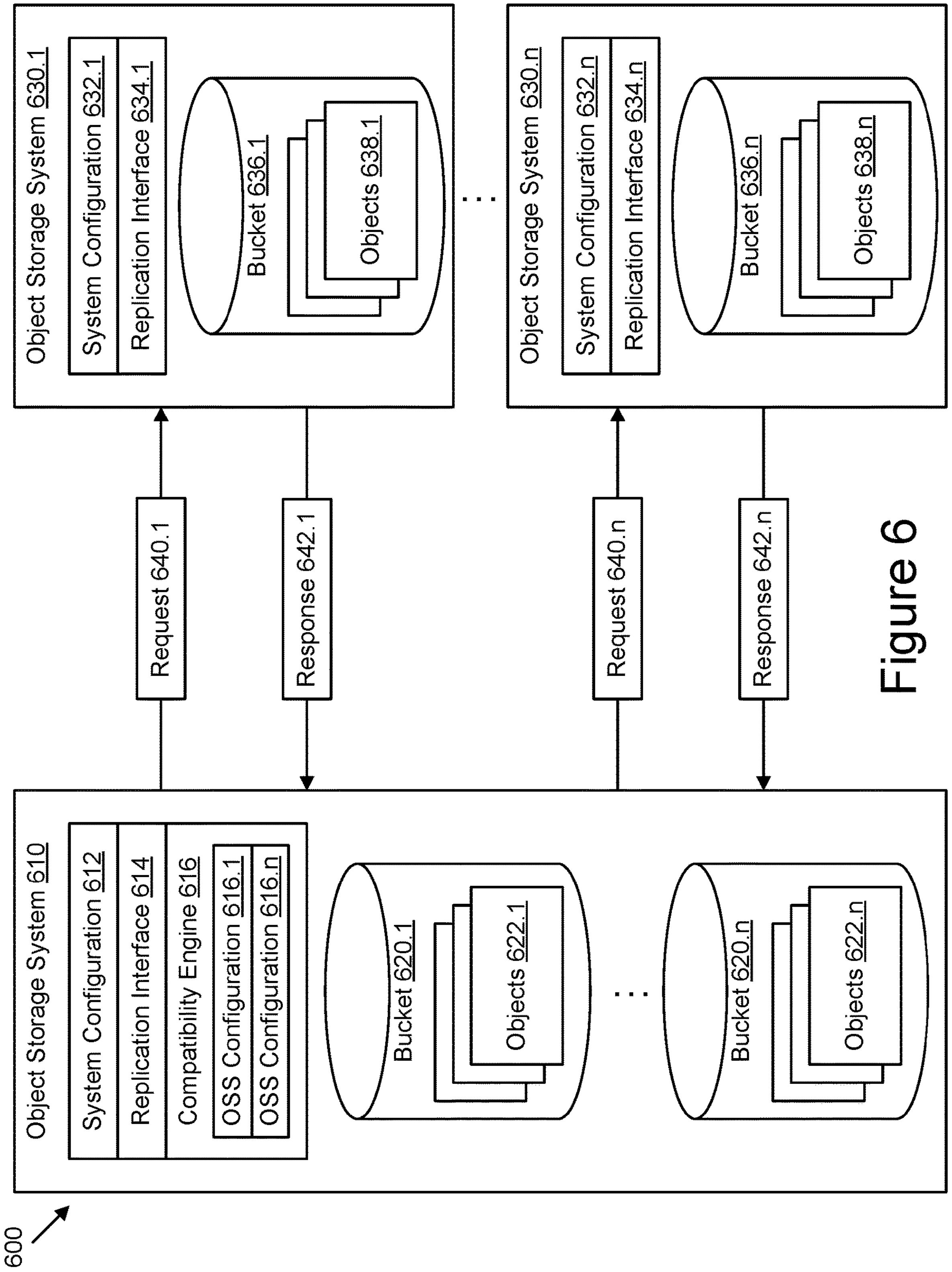
FIG. 6 schematically illustrates data objects transferred between example heterogeneous data stores.

FIG. 6 shows a distributed object storage architecture 600 for replicating data objects across multiple heterogeneous object storage systems 610 and 630.1-630.*n*. In some embodiments, object storage systems 610 and 630.1-630.*n* may be configured according to the systems and elements described with regard to FIGS. 1-5. In the example shown, object storage system 610 is configured to replicate a plurality of storage buckets 620.1-620.*n* to a corresponding plurality of heterogeneous object storage systems 630.1-630.*n* using compatibility engine 616 to translate replication operations into requests 640.1-640.*n* compatible with the respective object storage systems 630.1-630.*n*. In some embodiments, object storage system 610 may be referred to as the source system and object storage systems 630.1-630.*n* may be referred to as the destination storage systems.

Object storage system 610 may be configured with system configuration 612, such as a vendor-specific implementation of an object storage standard (e.g. S3, etc.). Object storage systems 630.1-630.*n* may be configured with system configurations 632.1-632.*n* that are different than system configuration 612. For example, system configurations 632.1-632.*n* may be other vendor-specific implementations of the same object storage standard or may implement an entirely different object storage standard. System configurations 632.1-632.*n* may not be completely compatible with the native replication operations, such as the syntax, features, and parameters, of system configuration 612, such that a native replication operation sent in requests 640.1-640.*n* would generate a different result if executed on object storage systems 630.1-630.*n*. In some embodiments, attempted execution of the native replication operations from object storage system 610 would generate errors that would be returned in responses 642.1-642.*n*.

Object storage systems 610 and 630.1-630.*n* may each include respective replication interfaces 614 and 634.1-634.*n*. For example, each may provide a storage interface that includes a plurality of APIs for receiving communication from other systems, including other storage systems. These APIs may include one or more replication APIs for receiving data object replication operations, such as PUT and multipart PUTs. Replication interfaces 614 and 634.1-634.*n* may define the syntax for receiving replication operations and the features and parameters enabled for replication operations on their respective systems. Replication interfaces 614 and 634.1-634.*n* may include or be compatible with network messaging standards for communications between object storage systems 610 and 630.1-630.*n*, including request messages 640.1-640.*n* and response messages 642.1-642.*n*.

In the example shown, object storage system 610 include storage buckets 620.1-620.*n* and each of storage buckets 620.1-620.*n* include respective data objects 622.1-622.*n*. An associated system administrator may desire to replicate storage buckets 620.1-620.*n* to different storage systems for a variety of reasons, such as availability, load balancing, security features, failover, migration strategies, lifecycle management, etc., even though the other systems are not entirely compatible with object storage system 610. Object storage system 610 may include compatibility engine 616, which includes configuration support for translating source or native replication operations into destination replication operations compatible with each target system. For example, compatibility engine 616 may include a plurality of translation functions indexed by configuration identifiers for each of the destination object storage systems. In some embodiments, replication operation translators for each object storage system (OSS) configuration 616.1-616.*n* may be included in or accessible to compatibility engine 616.

As each of storage buckets 620.1-620.*n* and/or data objects 622.1-622.*n* therein are replicated to object storage systems 630.1-630.*n*, compatibility engine 616 is invoked to translate native replication operations into destination replication operations. Those destination replication operations may be packaged in requests 640.1-640.*n* sent from replication interface 614 to replication interfaces 634.1-634.*n*. Requests 640.1-640.*n* may enable object storage systems 630.1-630.*n* to complete each storage operation and return responses 642.1-642.*n*.

Figure 7:
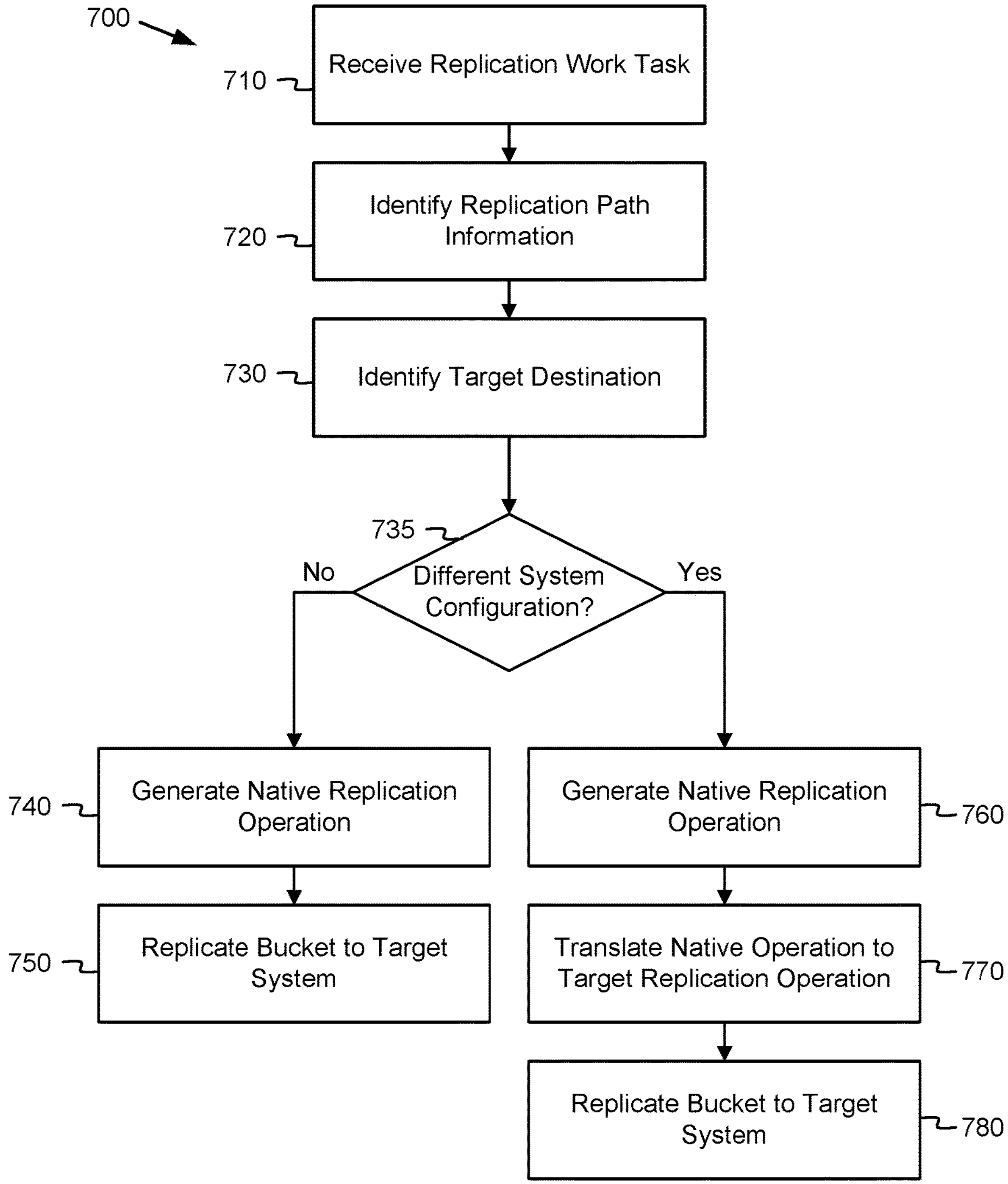
FIG. 7 illustrates an example method for replicating buckets to heterogeneous storage systems.

As shown in FIG. 7, the object storage system 500 may be operated according to an example method for replicating buckets to heterogeneous storage systems, i.e. according to the method 700 illustrated by the blocks 710-780 of FIG. 7.

At block 710, a replication work task is received or generated. For example, an object storage system may be configured for periodic replication or replication may be initiated by a user or system utility. The replication task may identify the storage bucket and/or data objects to be replicated and a target destination system to which data objects in the storage bucket are to be replicated. The replication task may be provided to a replication manager.

At block 720, replication path information may be determined based on the storage bucket. For example, the storage bucket may have an associated replication configuration file that includes a destination path to specify where the data objects in the storage bucket should be replicated to.

At block 730, the target destination may be identified. For example, the destination path may include a complete path name for locating a target destination data store, such as a complete resource name (e.g. ARN). The target destination may enable the replication manager to determine whether the destination is on another storage system.

At block 735, the system may determine whether the destination storage system has a different configuration than the source storage system. For example, a configuration identifier may be included in the replication path information. If the target destination has a similar configuration, method 700 may proceed to block 740. If the target destination has a different configuration, method 700 may proceed to block 760.

At block 740, a native replication operation may be generated. For example, the replication operation may be generated as a replication command that would be used within the storage system for replication between object stores, such as between storage nodes in the same storage system.

At block 750, the storage bucket is replicated to the target destination. For example, the native replication operations may be sent to the target destination storage system for each data object in the storage bucket until the storage bucket is completely replicated.

At block 760, a native replication operation may be generated. For example, the replication operation may be generated as a replication command that would be used within the storage system for replication between object stores, such as between storage nodes in the same storage system.

At block 770, the native replication operation may be translated to a target destination replication operation compatible with the configuration of the destination storage system. For example, the native replication operation may be translated by a compatibility engine based on a configuration identifier associated with the destination storage system.

At block 780, the storage bucket is replicated to the target destination. For example, the destination replication operations may be sent to the target destination storage system for each data object in the storage bucket until the storage bucket is completely replicated.

Figure 8:
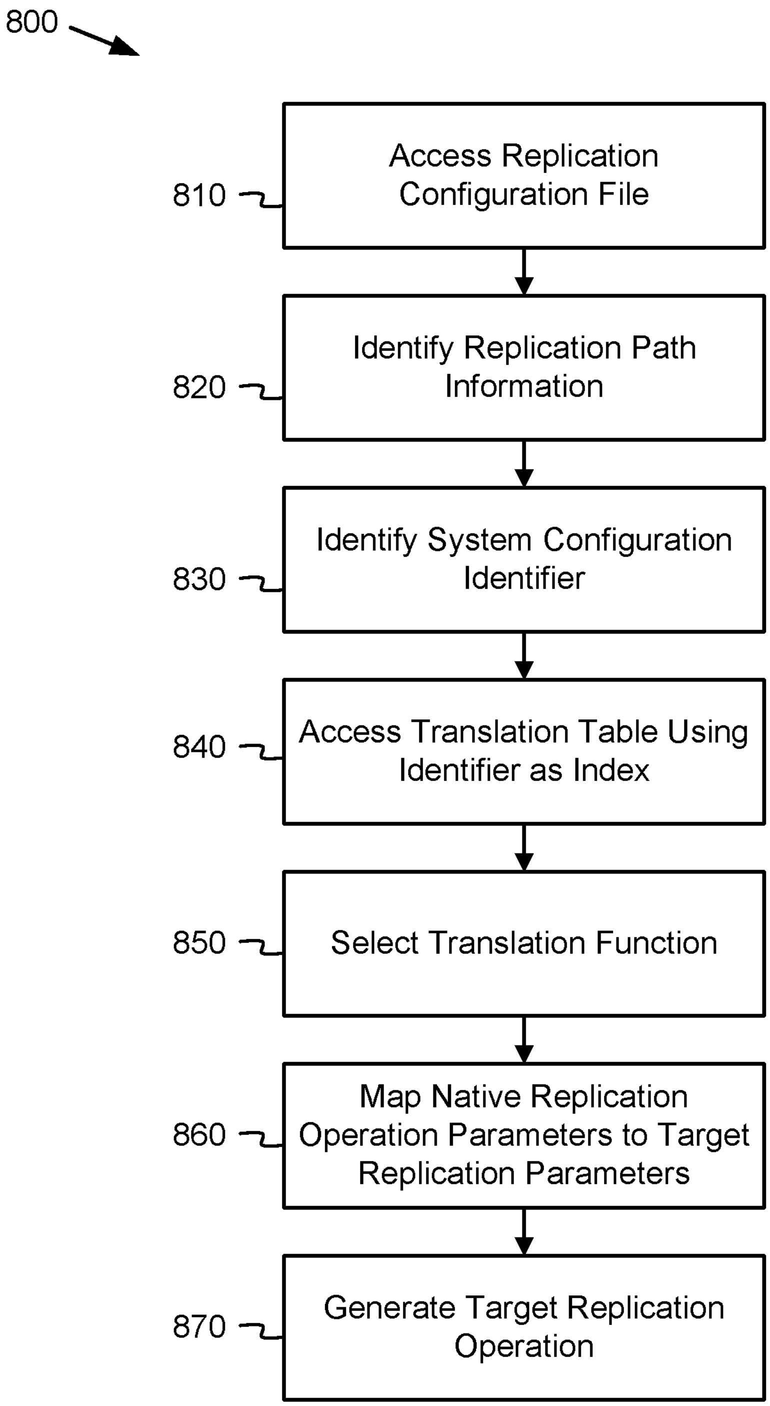
FIG. 8 illustrates an example method for translating replication operations for heterogeneous storage systems.

As shown in FIG. 8, the object storage system 500 may be operated according to an example method for translating replication operations for heterogeneous storage systems, i.e. according to the method 800 illustrated by the blocks 810-870 of FIG. 8. In some embodiments, method 800 may be operate in conjunction with the example method 700 of FIG. 7 to support one or more blocks of method 700.

At block 810, a replication configuration file is accessed. For example, for any replication task, the system may access a replication configuration file for the source storage bucket and/or target data object to determine one or more configuration rules or parameters for use in the replication operations.

At block 820, replication path information may be identified. For example, the replication configuration file may include a destination rule or parameter that defines the destination resource identifier for the replication task and the system may identify the replication path information from the destination resource identifier.

At block 830, a configuration identifier for the destination storage system may be identified. For example, the replication path information may include a plurality of identifier values describing the replication path and one of these identifier values may be or include the configuration identifier. In some embodiments, the configuration identifier may be identified based on the destination storage system identified in the replication path through another method, such as a metadata lookup or a separate entry in the replication configuration file.

At block 840, a translation table may be accessed using the configuration identifier as an index value. For example, the translation table may include a list of all possible configuration identifiers and the system may search the translation table for the entry in the list matching the configuration identifier value from block 830.

At block 850, a translation function may be selected based on the configuration identifier. For example, the entry in the translation table corresponding to the configuration identifier may include a translation function name or other pointer to a translation function for the destination system configuration. In some embodiments, the translation functions may be included in a library and the configuration identifier may be included as an argument on a call to the library for accessing the selecting and using the translation function without the intermediate step of block 840 and using a translation table.

At block 860, the native replication operation parameters may be mapped to target replication parameters using the selected translation function. For example, the translation function may accept the native replication operation or parameters thereof as arguments and/or process those parameters to map them to corresponding syntax and parameters for the destination system.

At block 870, the target replication operation for the destination storage system may be generated in response to the mapping of block 860. For example, mapping the parameters from the native replication operation may generate the target replication operation in a format compatible with the replication interface of the destination storage system and enable its communication or transmission from the source storage system to the destination storage system.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
a first object data store configured in a native system configuration and configured to comprise:
a first storage bucket configured to include a first plurality of data objects; and
a second storage bucket configured to include a second plurality of data objects; and
a replication manager, stored in and executable by a controller for the first object data store, configured to:
identify a first target storage system for the first storage bucket, wherein the first target storage system has a first system configuration that is different than the native system configuration;
selectively translate a first native replication operation to a first target replication operation compatible with the first system configuration, wherein:
the first target replication operation includes at least one translated first target operation feature for replicating the first plurality of data objects to the first target storage system using the first system configuration;
the at least one translated first target operation feature is not in the first native replication operation; and
the at least one translated first target operation feature is selected from parameters and syntax for the first target storage system;
replicate the first storage bucket to the first target storage system using the first target replication operation;
identify a second target storage system for the second storage bucket, wherein the second target storage system has a second system configuration that is different than the native system configuration and different than the first system configuration;
selectively translate a second native replication operation to a second target replication operation compatible with the second system configuration, wherein:
the second target replication operation includes at least one translated second target operation feature for replicating the second plurality of data objects to the second target storage system using the second system configuration;
the at least one translated second target operation feature is not in the second native replication operation; and
the at least one translated second target operation feature is selected from parameters and syntax for the second target storage system; and
replicate the second storage bucket to the second target storage system using the second target replication operation.

2. The system of claim 1, further comprising:
a compatibility engine in communication with the replication manager and configured to:
identify a first system configuration identifier for the first target storage system;
select, using the first system configuration identifier, a first translation function for the first system configuration, wherein the replication manager is configured to selectively translate, using the first translation function, the first native replication operation to the first target replication operation;
identify a second system configuration identifier for the second target storage system; and
select, using the second system configuration identifier, a second translation function for the second system configuration, wherein the replication manager is configured to selectively translate, using the second translation function, the second native replication operation to the second target replication operation.

3. The system of claim 2, further comprising:
a translation table configured to comprise:
an index of system configuration identifiers, wherein the index of system configuration identifiers includes the first system configuration identifier and the second system configuration identifier; and
a plurality of translation functions, wherein the plurality of translation functions includes:
at least one translation function for each system configuration identifier in the index of system configuration identifiers;
the first translation function; and
the second translation function.

4. The system of claim 1, wherein the replication manager is further configured to:
receive a first replication work task for the first storage bucket;
identify first replication path information for the first replication work task, wherein the first replication path information:
identifies the first target storage system; and
includes a first system configuration identifier;
use the first system configuration identifier to selectively translate the first native replication operation to the first target replication operation;
receive a second replication work task for the second storage bucket;
identify second replication path information for the second replication work task, wherein the second replication path information:
identifies the second target storage system; and
includes a second system configuration identifier; and
use the second system configuration identifier to selectively translate the second native replication operation to the second target replication operation.

5. The system of claim 4, wherein the replication manager is further configured to:
access the first replication path information from a first replication configuration file for the first storage bucket; and
access the second replication path information from a second replication configuration file for the second storage bucket.

6. The system of claim 4, wherein:
the first replication path information includes a first partition value;
the first partition value includes the first system configuration identifier;
the second replication path information includes a second partition value; and
the second partition value includes the second system configuration identifier.

7. The system of claim 6, wherein:

the first replication path information further includes a first service identifier, a first region identifier, a first account identifier, and a first destination bucket identifier; and the second replication path information further includes a second service identifier, a second region identifier, a second account identifier, and a second destination bucket identifier.

8. The system of claim 4, further comprising:

a replication configuration interface configured to:

receive the first replication path information;

store the first replication path information, wherein the replication manager is further configured to access, responsive to receiving the first replication work task, the first replication path information;

receive the second replication path information; and store the second replication path information, wherein the replication manager is further configured to access, responsive to receiving the second replication work task, the second replication path information.

9. A computer-implemented method, comprising:

identifying, by a source storage system having a source system configuration, a first target storage system for a first storage bucket from the source storage system, wherein the first target storage system has a first system configuration that is different than the source system configuration;

selectively translating, by the source storage system, a first source replication operation to a first target replication operation compatible with the first system configuration, wherein:

the first target replication operation includes at least one translated first target operation feature for replicating a first plurality of data objects in the first storage bucket to the first target storage system using the first system configuration;

the at least one translated first target operation feature is not in the first source replication operation; and the at least one translated first target operation feature is selected from parameters and syntax for the first target storage system;

replicating, by the source storage system, the first storage bucket to the first target storage system using the first target replication operation;

identifying, by the source storage system, a second target storage system for a second storage bucket from the source storage system, wherein the second target storage system has a second system configuration that is different than the source system configuration and different than the first system configuration;

selectively translating, by the source storage system, a second source replication operation to a second target replication operation compatible with the second system configuration, wherein:

the second target replication operation includes at least one translated second target operation feature for replicating a second plurality of data objects in the second storage bucket to the second target storage system using the second system configuration;

the at least one translated second target operation feature is not in the second source replication operation; and the at least one translated second target operation feature is selected from parameters and syntax for the second target storage system; and replicating, by the source storage system, the second storage bucket to the second target storage system using the second target replication operation.

10. The computer-implemented method of claim 9, further comprising:

identifying a first system configuration identifier for the first target storage system;

selecting, using the first system configuration identifier, a first translation function for the first system configuration, wherein selectively translating the first source replication operation to the first target replication operation uses the first translation function;

identifying a second system configuration identifier for the second target storage system; and selecting, using the second system configuration identifier, a second translation function for the second system configuration, wherein selectively translating the second source replication operation to the second target replication operation uses the second translation function.

11. The computer-implemented method of claim 9, further comprising:

receiving a first replication work task for the first storage bucket;

identifying first replication path information for the first replication work task, wherein the first replication path information:

identifies the first target storage system; and includes a first system configuration identifier, wherein selectively translating the first source replication operation to the first target replication operation uses the first system configuration identifier;

receiving a second replication work task for the second storage bucket; and identifying second replication path information for the second replication work task, wherein the second replication path information:

identifies the second target storage system; and includes a second system configuration identifier, wherein selectively translating the second source replication operation to the second target replication operation uses the second system configuration identifier.

12. The computer-implemented method of claim 11, further comprising:

accessing the first replication path information from a first replication configuration file for the first storage bucket; and accessing the second replication path information from a second replication configuration file for the second storage bucket.

13. The computer-implemented method of claim 11, wherein:

the first replication path information includes a first partition value;

the first partition value includes the first system configuration identifier;

the second replication path information includes a second partition value; and the second partition value includes the second system configuration identifier.

14. The computer-implemented method of claim 13, wherein:

the first replication path information further includes a first service identifier, a first region identifier, a first account identifier, and a first destination bucket identifier; and the second replication path information further includes a second service identifier, a second region identifier, a second account identifier, and a second destination bucket identifier.

15. The computer-implemented method of claim 11, further comprising:

receiving the first replication path information through a replication configuration interface;

storing the first replication path information;

accessing, responsive to receiving the first replication work task, the first replication path information;

receiving the second replication path information through the replication configuration interface;

storing the second replication path information; and accessing, responsive to receiving the second replication work task, the second replication path information.

16. A system, comprising:

a first object data store configured in a source system configuration and configured to comprise:

a first storage bucket configured to include a first plurality of data objects; and a second storage bucket configured to include a second plurality of data objects;

a controller for the first object data store, comprising:

means for identifying:

a first target storage system for the first storage bucket, wherein the first target storage system has a first system configuration that is different than the source system configuration; and a second target storage system for the second storage bucket, wherein the second target storage system has a second system configuration that is different than the source system configuration and different than the first system configuration;

means for selectively translating:

a first source replication operation to a first target replication operation compatible with the first system configuration, wherein:

the first target replication operation includes at least one translated first target operation feature for replicating the first plurality of data objects to the first target storage system using the first system configuration;

the at least one translated first target operation feature is not in the first source replication operation; and the at least one translated first target operation feature is selected from parameters and syntax for the first target storage system; and a second source replication operation to a second target replication operation compatible with the second system configuration, wherein:

the second target replication operation includes at least one translated second target operation feature for replicating the second plurality of data objects to the second target storage system using the second system configuration;

the at least one translated second target operation feature is not in the second source replication operation; and the at least one translated second target operation feature is selected from parameters and syntax for the second target storage system; and means for replicating:

the first storage bucket to the first target storage system using the first target replication operation; and the second storage bucket to the second target storage system using the second target replication operation.

17. The system of claim 16, further comprising:

means for identifying:

a first system configuration identifier for the first target storage system; and a second system configuration identifier for the second target storage system; and means for selecting:

using the first system configuration identifier, a first translation function for the first system configuration, wherein the means for selectively translating the first source replication operation to the first target replication operation uses the first translation function; and using the second system configuration identifier, a second translation function for the second system configuration, wherein the means for selectively translating the second source replication operation to the second target replication operation uses the second translation function.

18. The system of claim 16, further comprising:

means for receiving:

a first replication work task for the first storage bucket; and a second replication work task for the second storage bucket; and means for identifying:

first replication path information for the first replication work task, wherein the first replication path information:

identifies the first target storage system; and includes a first system configuration identifier, wherein the means for selectively translating the first source replication operation to the first target replication operation uses the first system configuration identifier; and second replication path information for the second replication work task, wherein the second replication path information:

identifies the second target storage system; and includes a second system configuration identifier, wherein the means for selectively translating the second source replication operation to the second target replication operation uses the second system configuration identifier.

19. The system of claim 18, further comprising:

means for accessing:

the first replication path information from a first replication configuration file for the first storage bucket; and the second replication path information from a second replication configuration file for the second storage bucket.

20. The system of claim 19, wherein:

the first replication path information includes a first partition value;

the first partition value includes the first system configuration identifier;

the second replication path information includes a second partition value; and the second partition value includes the second system configuration identifier.

* * * * *